(12) United States Patent
Grigorovitch et al.

(10) Patent No.: US 7,827,554 B2
(45) Date of Patent: Nov. 2, 2010

(54) MULTI-THREAD MULTIMEDIA PROCESSING

(75) Inventors: Alexandre V. Grigorovitch, Redmond, WA (US); Gaurav Lochan, Stanford, CA (US); Patrick N. Nelson, Fairfax Station, VA (US)

(73) Assignee: Microsoft Corporation, Redmond, WA (US)

( * ) Notice: Subject to any disclaimer, the term of this patent is extended or adjusted under 35 U.S.C. 154(b) by 1365 days.

(21) Appl. No.: 11/157,113

(22) Filed: Jun. 20, 2005

(65) Prior Publication Data

US 2006/0288350 A1 Dec. 21, 2006

(51) Int. Cl.
G06F 9/46 (2006.01)
G06K 9/54 (2006.01)

(52) U.S. Cl. .................. 718/102; 718/100; 718/104; 382/303; 382/304

(58) Field of Classification Search ............... 718/103, 718/104, 108; 709/108; 717/158
See application file for complete search history.

(56) References Cited

U.S. PATENT DOCUMENTS

| | | | | |
|---|---|---|---|---|
| 5,404,318 A * | 4/1995 | Hoffert et al. | .............. | 709/200 |
| 5,638,112 A * | 6/1997 | Bestler et al. | .............. | 725/151 |
| 5,666,524 A * | 9/1997 | Kunkel et al. | .............. | 707/3 |
| 5,909,638 A * | 6/1999 | Allen | .............. | 725/146 |
| 6,434,649 B1 * | 8/2002 | Baker et al. | .............. | 710/107 |
| 6,560,674 B1 * | 5/2003 | Hosogi et al. | .............. | 711/118 |
| 6,782,368 B2 * | 8/2004 | Fujii et al. | .............. | 704/500 |
| 6,901,072 B1 * | 5/2005 | Wong | .............. | 370/389 |
| 6,925,549 B2 * | 8/2005 | Cook et al. | .............. | 712/25 |
| 7,137,110 B1 * | 11/2006 | Reese et al. | .............. | 717/158 |
| 7,191,432 B2 * | 3/2007 | Luick | .............. | 717/136 |
| 7,200,114 B1 * | 4/2007 | Tse-Au | .............. | 370/231 |
| 7,290,003 B1 * | 10/2007 | Tong | .............. | 1/1 |
| 7,388,586 B2 * | 6/2008 | Yeung et al. | .............. | 345/473 |
| 7,613,767 B2 * | 11/2009 | Debique et al. | .............. | 709/203 |
| 2002/0087830 A1 * | 7/2002 | Faraboschi et al. | .............. | 712/204 |
| 2003/0058150 A1 * | 3/2003 | Naka et al. | .............. | 341/161 |
| 2003/0154235 A1 * | 8/2003 | Sager | .............. | 709/108 |
| 2003/0236978 A1 * | 12/2003 | Evans et al. | .............. | 713/164 |
| 2004/0012597 A1 * | 1/2004 | Zatz et al. | .............. | 345/501 |
| 2004/0054876 A1 * | 3/2004 | Grisenthwaite et al. | .............. | 712/218 |
| 2004/0136241 A1 * | 7/2004 | Rapp et al. | .............. | 365/189.05 |
| 2004/0264383 A1 * | 12/2004 | Rudolph et al. | .............. | 370/252 |
| 2005/0021828 A1 * | 1/2005 | Kamen | .............. | 709/232 |
| 2005/0030980 A1 * | 2/2005 | Debique et al. | .............. | 370/536 |
| 2005/0044201 A1 * | 2/2005 | Suzuki et al. | .............. | 709/223 |
| 2005/0063586 A1 * | 3/2005 | Munsil et al. | .............. | 382/162 |
| 2005/0188107 A1 * | 8/2005 | Piercey et al. | .............. | 709/238 |
| 2006/0080407 A1 * | 4/2006 | Rengaraju | .............. | 709/219 |
| 2006/0133513 A1 * | 6/2006 | Kounnas | .............. | 375/240.26 |
| 2009/0222506 A1 * | 9/2009 | Jeffery et al. | .............. | 709/202 |
| 2010/0005192 A1 * | 1/2010 | Brown et al. | .............. | 709/238 |

* cited by examiner

*Primary Examiner*—Li B Zhen
*Assistant Examiner*—Abdullah Al Kawsar
(74) *Attorney, Agent, or Firm*—Lee & Hayes, PLLC

(57) ABSTRACT

Systems and/or methods are described that enable multi-threaded multimedia processing. These systems and/or methods may, in some embodiments, allocate threads for components of a multimedia pipeline based on input/output characteristics of the components. These systems and/or methods may also allocate threads and priorities for those threads based on a relative importance given components of two or more multimedia pipelines.

19 Claims, 10 Drawing Sheets

MULTI-THREAD MULTIMEDIA PROCESSING

BACKGROUND

Rendering multimedia can be a processor-intensive exercise. Insufficient processing power can result in glitches in media rendering, like a delay in a soundtrack or video playback of a movie.

In part to address this need for greater processing power, computing devices have been designed to execute more than one processing thread at a time. Some media-rendering processes have components that take advantage of these devices by allocating and using their own threads.

But building components able to allocate their own threads can be more difficult than building components without this ability. Also, these components may use significant processing resources to create and manage their own threads.

These components also may allocate threads poorly. They may use too many or too few processing resources, often because they are not fully aware of upstream and downstream components of a multimedia pipeline of which they are a part. They may also create too many threads, thereby wasting processing resources used to switch between threads.

SUMMARY

This Summary is provided to introduce a selection of concepts in a simplified form that are further described below in the Detailed Description. This Summary is not intended to identify essential features or determine the scope of the claimed subject matter.

Systems and/or methods ("tools") are described below that enable multi-threaded multimedia processing. The tools may allocate threads for components of a multimedia pipeline based on input/output characteristics of the components. The tools may also allocate threads through a controller instead of through components, thereby potentially reducing the time and complexity needed to build components of a multimedia pipeline.

In some embodiments, the tools allocate threads and priorities for those threads based on the relative importance given end components of a multimedia pipeline. By so doing a user may enjoy higher-quality rendering on media that is important to the user.

BRIEF DESCRIPTION OF THE DRAWINGS

The same numbers are used throughout the disclosure and figures to reference like components and features.

DETAILED DESCRIPTION

Overview

The following document describes system(s) and/or method(s) ("tools") for managing a multimedia pipeline. The tools may allocate threads and/or priorities for components of a multimedia pipeline.

In one embodiment, for instance, the tools allocate one thread to a particular component or series of components and another thread to another component or series of components. If there is a potential conflict by one thread taking too many processing resources such that it may cause a glitch or delay, the tools can set a priority for each thread so that a glitch or delay happens on a less important thread.

The tools may also, in another embodiment, allocate and control threads through a controller. One advantage of a controller doing so rather than components of a multimedia pipeline, is that components often know less about priorities and likely usage of upstream and downstream components than the controller. Using a controller the tools may enable more efficient processor usage. The tools may also enable components of media applications to more easily be developed by reducing the complexity of programming for these components.

Exemplary Operating Environment

Before describing the tools in detail, the following discussion of an exemplary operating environment is provided to assist the reader in understanding where and how the tools may be employed. The description provided below constitutes but one example and is not intended to limit application of the tools to any one particular operating environment.

Figure 1:
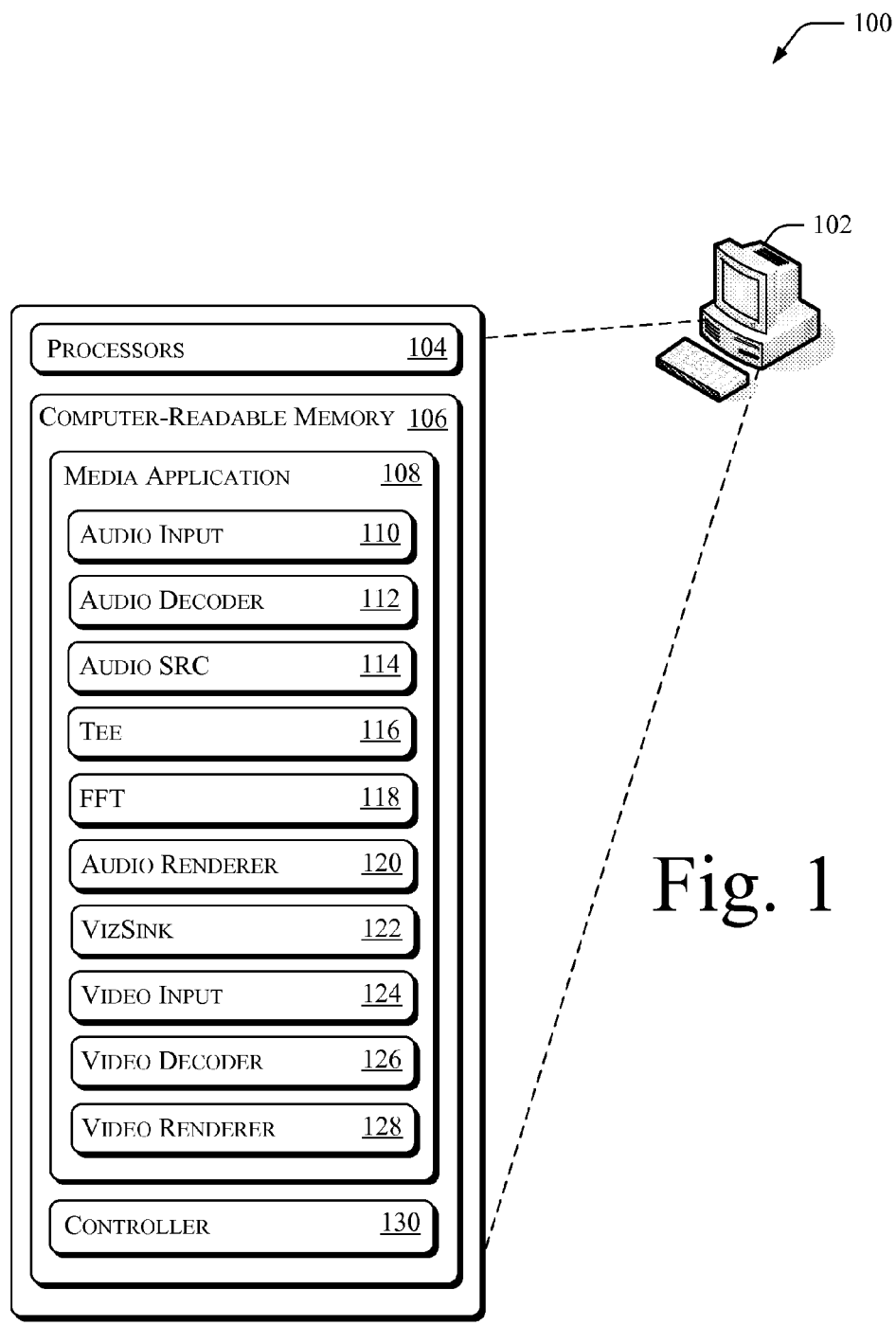
FIG. 1 illustrates an exemplary operating environment in which various embodiments can operate.

FIG. 1 illustrates one such operating environment generally at 100 comprising a computer 102 having processors 104 and computer-readable memory 106. Memory 106 may be volatile (such as RAM), non-volatile (such as ROM, flash memory, etc.) or some combination of volatile and non-volatile. Memory 106 includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical memory medium which can be used to store the desired information and which can be accessed by the processors 104. The processors are capable of accessing and/or executing the computer-readable memory. The computer-readable memory comprises or has access to a media application 108, which comprises components capable of acting in a multimedia pipeline. These components include: an audio input 110; an audio decoder 112; an audio Sample Rate Converter (SRC) 114; a tee 116; a Fast Fourier Transform (FFT) 118; an audio renderer 120; a visualization sink (VizSink) 122; a video input 124; a video decoder 126; and a video renderer 128. These components are capable of transforming media data, performing effects on or using media data, and/or duplicating media data for use by multiple components. Other types of components can also be used, like those capable of composing media data from two sources and passing it to another component, though these are not illustrated in this environment.

The computer-readable memory also comprises or has access to a controller 130. The controller is capable of managing a media pipeline, such as by allocating threads and/or priorities to components of the media pipeline.

Exemplary Multimedia-Pipeline Topology

The following exemplary topology for a multimedia pipeline is described to aid the reader in understanding one way in which a particular pipeline can be oriented. The multimedia pipeline is represented as a topology of components, such as transformation and effect components. This pipeline is not intended to limit the application of the tools to multimedia applications, multimedia pipelines, or this particular pipeline.

Figure 2:
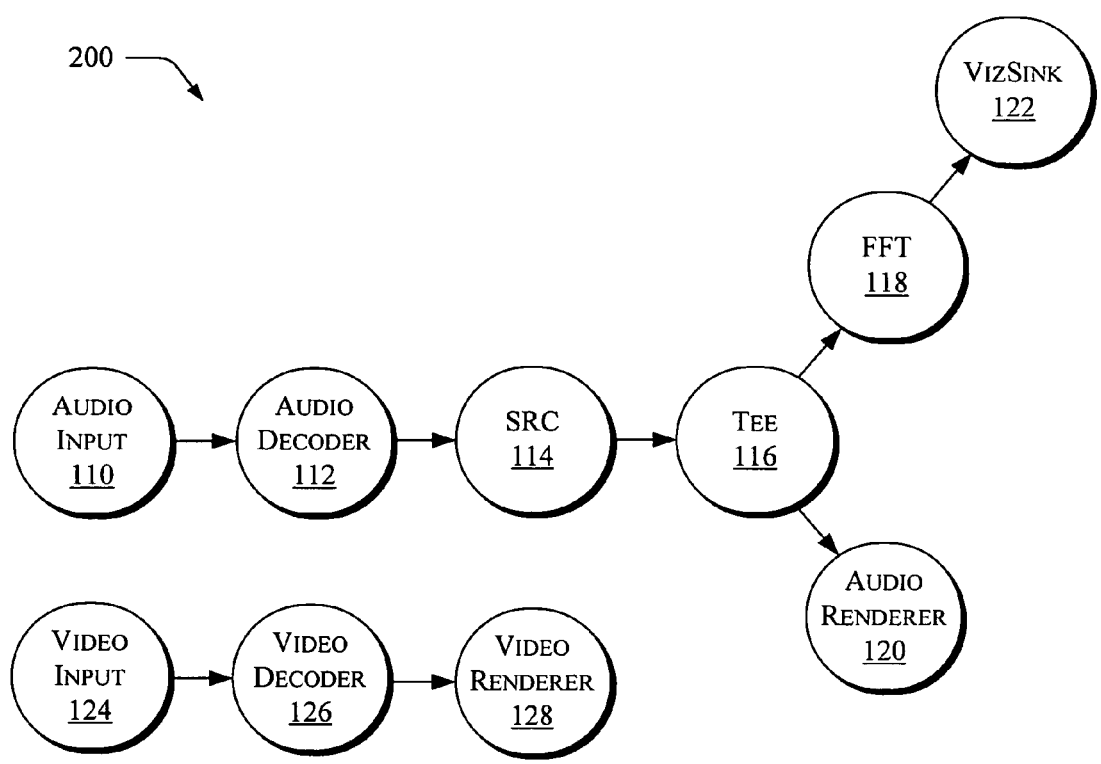
FIG. 2 illustrates an exemplary media pipeline topology.

FIG. 2 illustrates an exemplary topology 200 for a multimedia pipeline having the components shown in media application 108. This topology shows the orientation of the components of the media application and their interaction with each other. Audio input 110 and video input 124 pass audio and video data to other components. These components are called transform components because they pass data to a single other component of the topology. A group of transform components can act in series. Audio input 110 passes data to audio decoder 112, which transforms (here decodes) this input and then passes it to SRC 114. The SRC transforms the decoded data and passes the results to tee 116. Audio decoder and SRC are also transforms that act in series. Likewise, video decoder 126 transforms data from video input 124 and passes the transformed data to video renderer 128. Video decoder 126 is also a transform that acts in series.

Tee 116, however, acts to send data to two different components, here FFT 118 and audio renderer 120. The tee operates in the topology to permit data to branch off into different pipes of the pipeline. FFT 118 acts as a transform, 19 sending its output to VizSink 122.

This topology shows how multimedia data (here audio and video data) can be rendered and stored. This pipeline acts to render video on a computer display, render audio through speakers, and store audio. The computer 102 can present to a user a music video, movie, or other program by the media application performing this multimedia pipeline.

Allocating Threads and Assigning Priorities

The following discussion describes exemplary ways in which the tools allocate threads and/or assign priorities to components of a multimedia pipeline.

Figure 3:
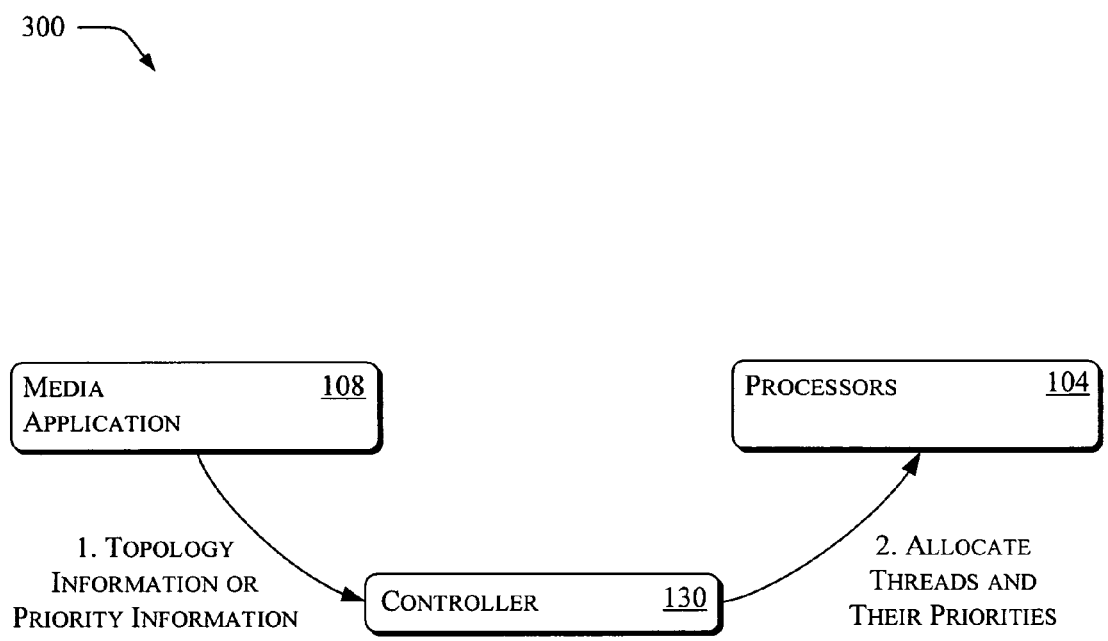
FIG. 3 is an exemplary flow diagram for allocating threads and/or assigning priorities to components of a media pipeline.

Referring to FIG. 3, an exemplary flow diagram 300 for allocating threads and/or assigning priorities is shown. Flow diagram 300 is illustrated as a set of actions by, and accompanying communications between, elements of environment 100, though these actions are not limited to the elements of environment 100. The actions and accompanying communications are marked with arrows. This flow diagram may be implemented in any suitable hardware, software, firmware, or combination thereof. In the case of software and firmware, this diagram represents sets of operations implemented as computer-executable instructions.

Flow diagram 300 is described generally and with illustrated examples. In one example, the tools allocate threads based on non-overlapping inputs to components in a pipeline's topology. In another example, the tools assign threads having different priorities based on components having non-overlapping inputs in a pipeline's topology and relative importance of particular components.

Arrow 1 receives topology and/or priority information for components of a multimedia pipeline. Arrow 1 may receive topology information comprising a topology mapping input and output characteristics of components of a pipeline or instead information about components of the pipeline from which arrow 1 may ascertain the topology. In some cases a media application is capable of sending a complete topology. In some others, each component can send information about how it interacts with neighboring components.

In the first illustrated example, controller 130 receives topology-related information from each of the components of media application 108 setting out each of their input/output characteristics. Controller 130 receives the following information:

audio input 110 outputs to audio decoder 112;

audio decoder 112 receives from audio input 110 and outputs to SRC 114;

SRC 114 receives from audio decoder 112 and outputs to tee 116;

tee 116 receives from SRC 114 and outputs to both FFT 118 and audio renderer 120;

FFT 118 receives from tee 116 and outputs to VizSink 122;

VizSink receives from FFT 118 and does not output;

audio render 120 receives from tee 116 and does not output;

video input 124 outputs data to video decoder 126;

video decoder 126 receives from video input 124 and outputs to video renderer 128; and video renderer 128 receives from video decoder 126 and does not output.

Figure 4:
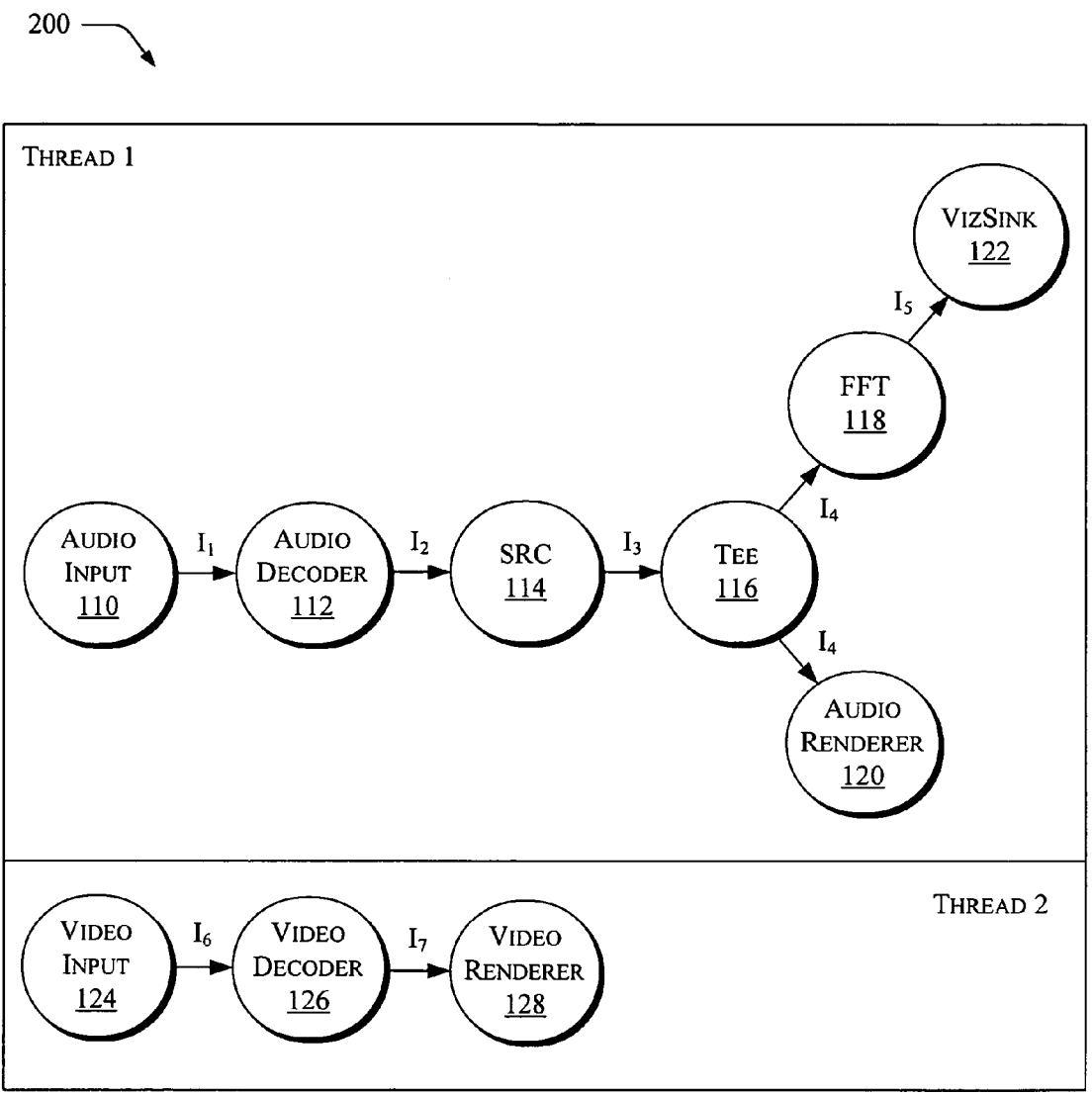
FIG. 4 illustrates inputs and two allocated threads for the pipeline of FIG. 2.

Each of these inputs/outputs are illustrated in FIG. 4 and represented by "$I_n$," where "$n$" represents an input/output. Based on this input/output information, the controller ascertains whether or not there are any overlapping inputs to end components of the pipeline. Thus, the controller ascertains the direct and indirect inputs to each end component: video renderer 128; VizSink 122; and audio renderer 120. The audio renderer has the following inputs: $I_1$; $I_2$; $I_3$; and $I_4$. The VizSink has the following inputs: $I_1$; $I_2$; $I_3$; $I_4$; and $I_5$. The video renderer has the following inputs: 16 and 17. Based on this information, the controller can ascertain s what topology is being used. This may include ascertaining which components provide a direct or indirect input to each of the end components and whether each end component has an overlapping input within another end component. Here the controller ascertains that video renderer 128 has no overlapping inputs with VizSink 122 or audio renderer 120. It also ascertains that VizSink 122 and audio renderer 120 having overlapping inputs ($I_1$, $I_2$, $I_3$, and $I_4$).

Arrow 2 allocates threads and/or priorities to components of a multimedia pipeline. In the first illustrated example shown in FIG. 4, controller 130 received topology-related information and ascertained the topology for the pipeline. The controller also ascertained which components go to end components have an overlapping input. The controller allocates threads based on this topology, in this case a single thread to end components having an overlapping input and a single thread to each end component not having an overlapping input. Here the controller allocates a thread to each non-overlapping group of components of topology 200 of FIG. 2. The set of audio input 110 to audio renderer 120 and VizSink 122 is one group because their end components have overlapping inputs. Video input 124 to video renderer 128 are another group. The separate threads are shown in boxes and marked Thread 1 and Thread 2 in FIG. 4.

By so allocating, each thread does not overlap, permitting each thread to be processed by separate cores or processors. This may enable a computer capable of executing multiple threads at once to perform multiple pipes of a multimedia pipeline also at once.

In a second illustrated embodiment, the tools allocate priorities to threads and/or allocate additional threads based on priority information received. For the purposes of this illustration, the same topology 200 is received or ascertained, shown in FIG. 2.

Arrow 1 receives information indicting that audio renderer 120 has a higher priority than VizSink 122 and video renderer 128. With this information, controller 130 can allocate additional threads and/or assign priorities to threads.

First, arrow 1 can ascertain, based on the topology information, which components provide an input to a high-priority component. Arrow 1 can assign a high priority to each thread having these components. Here controller 130 ascertains that audio input 110, audio decoder 112, SRC 114, and Tee 116 are components providing input to the high-priority component audio renderer 120. The controller may assign a high priority to thread 1 of FIG. 4 based on this determination. The controller may also assign a low priority to thread 2 of FIG. 4 based on it not providing input to a high-priority component.

Figure 5:
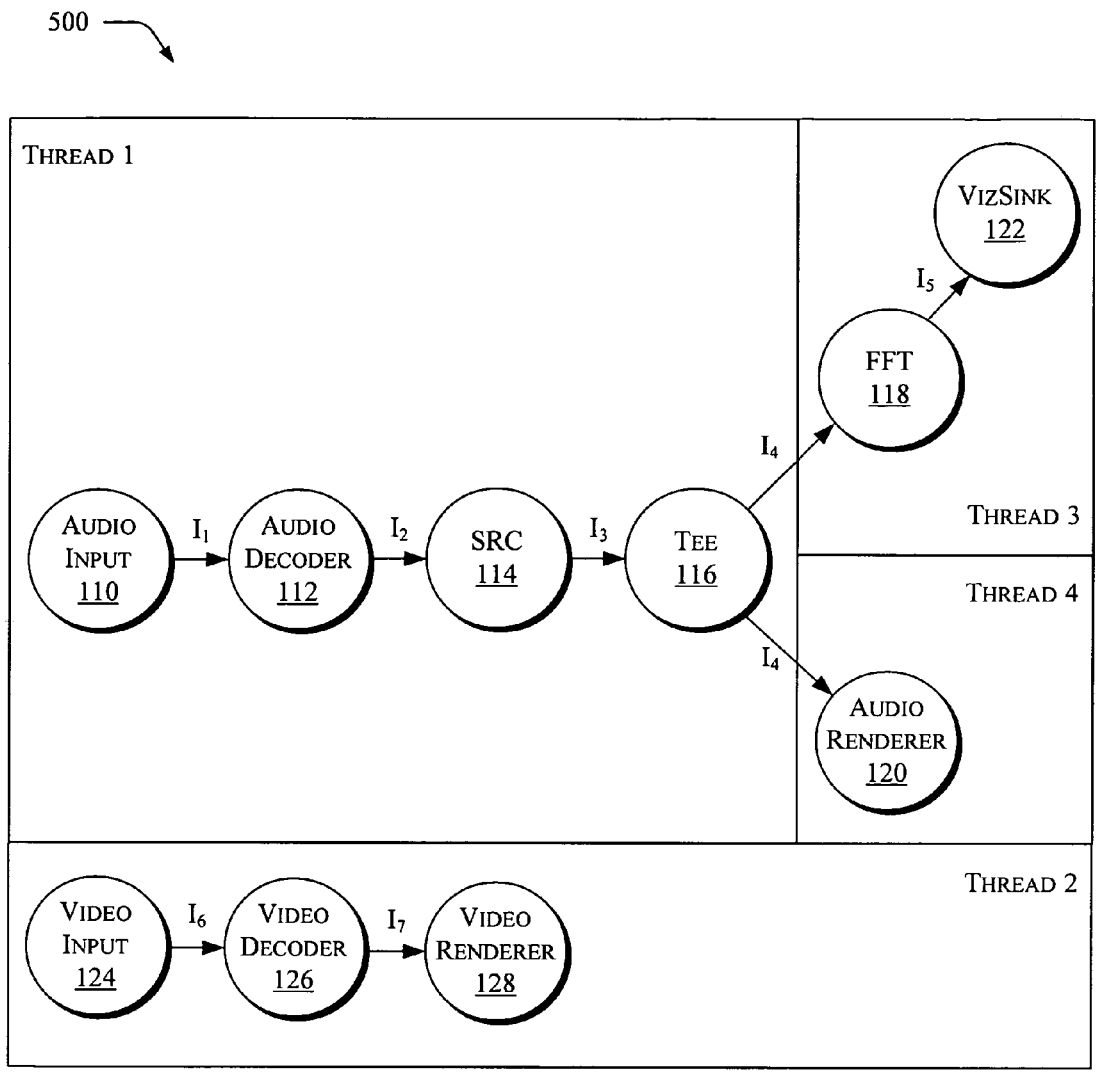
FIG. 5 illustrates four allocated threads for the pipeline of FIG. 2.

Second, arrow 1 can ascertain if a component not providing an input to the high-priority component may conflict with any of these components. Here the controller may ascertain, in topology 200, that audio renderer 120 of thread 1 may conflict with FFT 118 or VizSink 122. This conflict can cause a delay or glitch in audio renderer 120 and/or VizSink 122. To address this, controller 130 may set a high priority for audio renderer 120 and a low or lower priority for VizSink 122 and FFT 118 so that a glitch or delay will first go to VizSink 122 and FFT 118 rather than audio renderer 120. To do so, arrow 2 allocates two addition threads to thread 1 of FIG. 4—threads 3 and 4. It also assigns a high priority to thread 4 and a low priority to thread 3. These new threads and reduction to thread 1 are shown in boxes in FIG. 5.

Controller 130 allocates these threads and sets the priority of thread 4 above that of thread 3 and thread 1 above that of thread 2. It sets thread 1 above that of thread 2 because the high-priority component of thread 4 receives inputs from thread 1. In this way, a lack of processing resources will cause a glitch or delay first to thread 3 or thread 2 rather than thread 4 or thread 1. Processors 104 execute these threads based on their priority. If thread 2 conflicts with thread 1 (which feeds to thread 4) or thread 4, thread 1 or 4 will be executed at higher priority and thread 2 will be executed (or not executed) at a lower priority. This may cause thread 2 to be delayed or allowed to glitch. Likewise, if thread 3 conflicts with thread 4, thread 4 will be executed at higher priority. This may cause thread 3 to be delayed or allowed to glitch.

Having each component allocate and control a thread often requires complex programming for each component. And each component may not have sufficient information to properly allocate threads or may allocate too many threads. Unnecessary threads can waste computational resources. A controller, however, may require significantly less processor usage for allocating and controlling threads and/or may allocate fewer threads. Also, the controller can enable components to not need to be programmed with this ability, potentially saving programming time and effort. The controller may also better allocate and control the multimedia pipeline of which the components are a part than the components themselves.

Multiple Media Pipelines

The following discussion describes exemplary ways in which the tools allocate threads and/or assign priorities to components of multiple media pipelines. In some situations a media application can perform multiple media pipelines, such as by showing a music video and an audio/video news clip. Components of these pipelines may conflict with each other and with components of another pipeline, potentially causing delays or glitches.

Figure 6:
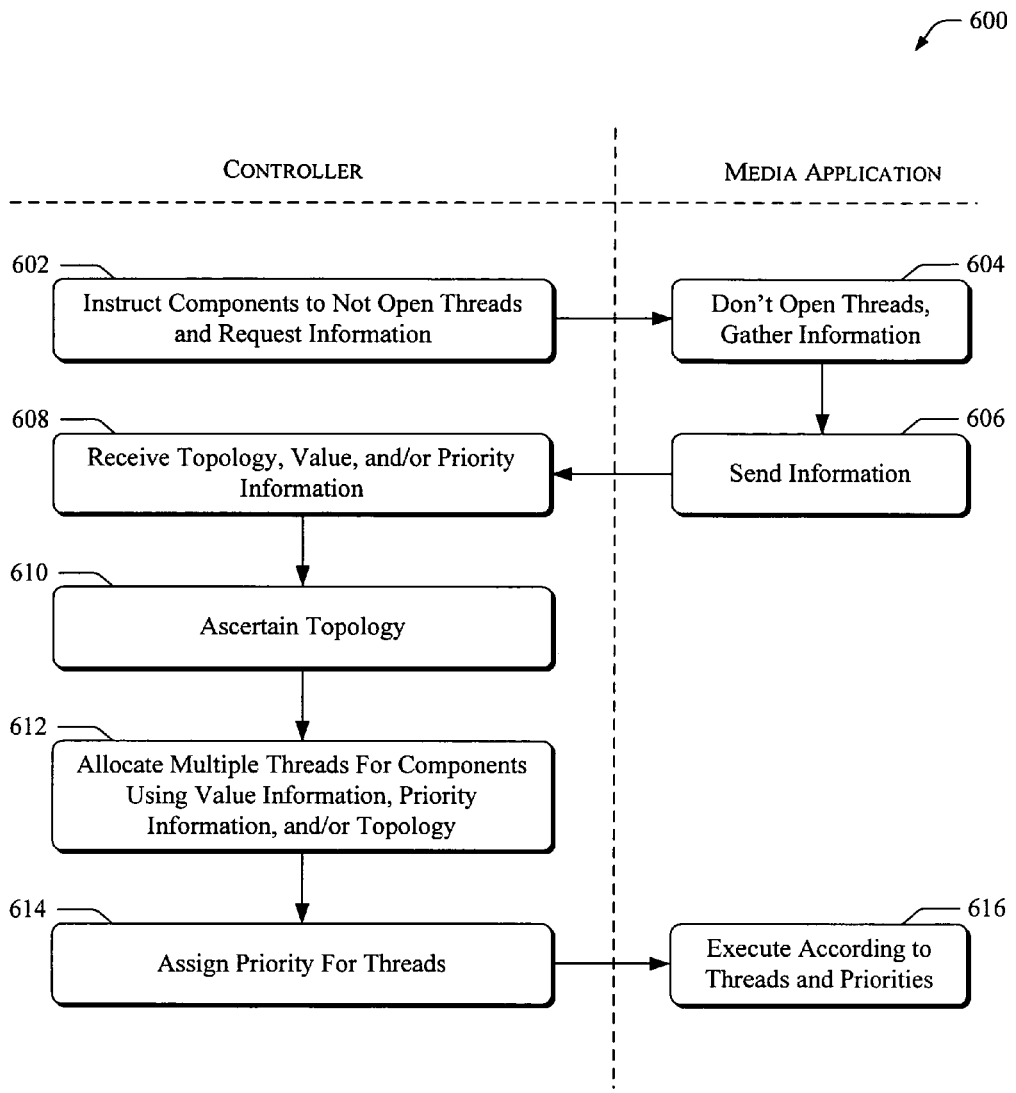
FIG. 6 is an exemplary process for allocating threads and/or assigning priorities to components of multiple media pipelines.

In FIG. 6, an exemplary process 600 is shown illustrated as a series of steps representing individual operations or acts performed by elements of the operating environment 100 of FIG. 1, though this process is not limited to environment 100. This and other processes disclosed herein may be implemented in any suitable hardware, software, firmware, or combination thereof; in the case of software and firmware, these processes represent a set of operations implemented as computer-executable instructions stored in computer-readable memory 106 and executable by processors 104.

Step 602 instructs components of a media application to not open threads. In some cases, components can open their own threads. Opening threads, as well as other management and control, may instead be maintained by the tools.

Step 602 also requests information from the media application and/or other sources. This information permits intelligent control by the tools. Step 602 can request input/output information for each component of each pipeline, priority information for each component, information regarding in what way the media of each pipeline is to be used or viewed, and information regarding the value of the media of each pipeline. Some of this information may be requested from other sources, such as a source -indicating that media of one pipeline is copyright protected, a purchase history indicating that it was received free or was purchased from a particular website, and the like.

Step 604 receives these requests and gathers information. Step 604 also acts to not open threads. The gathered information may comprise one or more of the following: input/output information indicating input/output characteristics of components; priority information regarding one or more components; usage information indicating how media of a pipeline is to be. used or viewed; and value information indicating a value of media of a pipeline.

Figure 7:
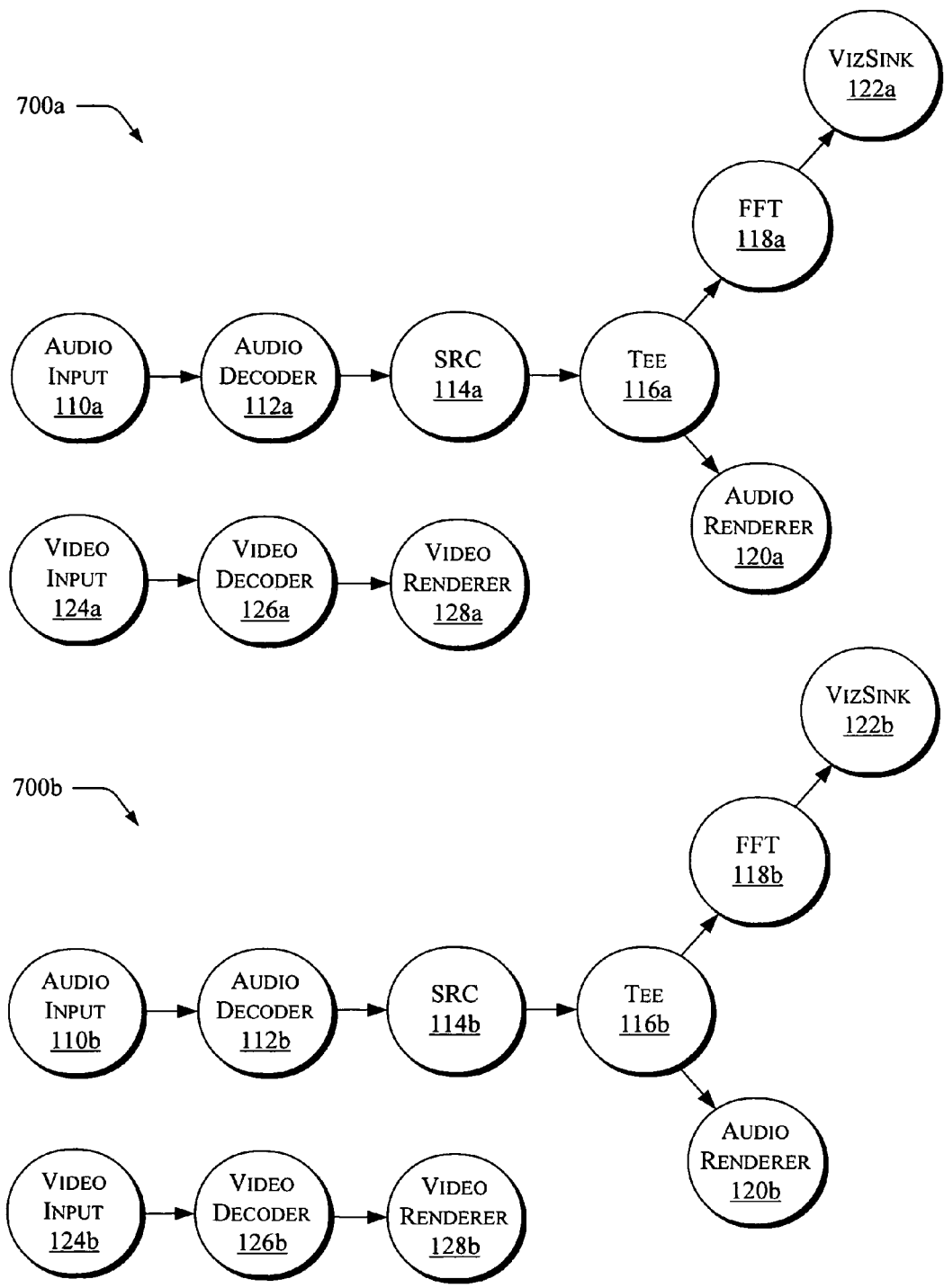
FIG. 7 illustrates two exemplary media pipeline topologies.

In an illustrated embodiment, media application 108 gathers information indicating that two media pipelines may be generated, that each is for audio/visual media, and each has a topology similar to that of topology 200 of FIG. 2. These two media pipelines are shown for illustration in FIG. 7 and marked 700a and 700b.

Media application also gathers information indicating that VizSink 122a and VizSink 122b are high priority, and that audio renderer 120a, audio renderer 120b, video renderer 128a, and video renderer 128b are lower in priority.

Step 604 can also gather information regarding in what way the media of each pipeline is to be used or viewed and information regarding the value of the 19 media of each pipeline. Here media application gathers value information indicating that the media of topology 700a is for a free news clip from an Internet website and that the media of topology 700b is for a high-definition music video with copyright protection that was purchased from another Internet website. This copyright and purchasing information may also be gathered by other sources. The media application gathers usage information indicating that the music video of topology 700b is to be rendered in a pane larger than that of the news clip and also in the front ground relative to the new clip of topology 700a. Step 606 sends the gathered information to the tools, which is received by step 608.

Step 610 ascertains topologies based on the information. Step 610 may do so as set forth above in flow diagram 300 based on input/output information. Step 610 can also receive a built topology from a media application.

Figure 8:
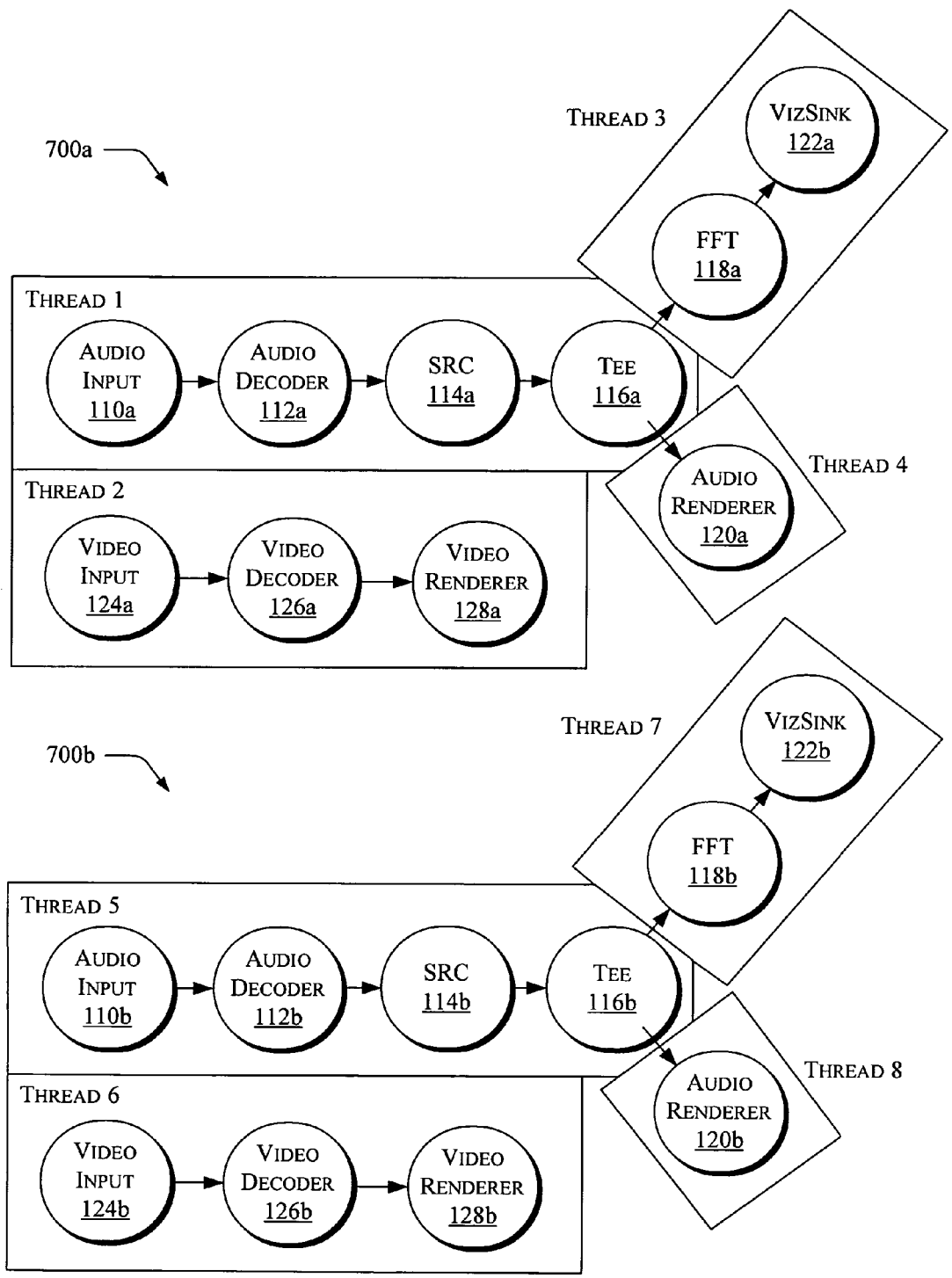
FIG. 8 illustrates allocated threads for the exemplary pipelines of FIG. 7.

Step 612 allocates threads based at least in part on the topology and/or priority information received. The tools can act according to flow diagram 300 to provide, for example, four threads for topologies 700a and 700b (each set of threads similar to those shown in FIG. 5). These four threads for each of topologies 700a and 700b are shown in FIG. 8.

Step 614 assigns priority to components based on information indicating the importance or value of the different medias. For example, controller 130 can ascertain which media of which topology is of higher importance. In this case, the controller can ascertain that the music video of topology 700b is more important because it is in the foreground relative to the news clip of topology 700a. It can also make this determination based on the music video be in high definition, having copyright protection, or having been paid for, each of which is not true of the news clip. Thus, based on any one or multiple value indicators, the tools may allocate priority to one media pipeline over another.

Based on this higher value of topology 700b, controller 130 assigns a highest priority to threads 5 and 7, a second highest priority to threads 6 and 8, a third highest priority to threads 1 and 3, and a fourth highest priority to threads 2 and 4. Each of these threads and their priorities is shown in FIG. 8. By so doing, the controller allocates threads and priorities so that VizSink 122b and the components from which it receives inputs will be the last to be delayed or have a glitch, followed by audio renderer 120b and video renderer 128b. After this, the VizSink 122a and its inputs will not be delayed or a glitch caused prior to audio renderer 120a or video renderer 128a being delayed or having a glitch.

Step 616 executes the components according to their threads and thread's priority. Here processors 104 execute the components following the threads. Threads 1, 2, 5, and 6 can be processed first, though thread 5 will have highest priority. Threads 3 and 4 will follow thread 1. Threads 7 and 8 will follow thread 5. In some scenarios many different threads may be executed at once (such as with multi-core or multiple processor machines). Assuming three processors, for instance, thread 5 may execute on a first processor, thread 6 on a second processor, and threads 1 and 2 (not simultaneously) on a third processor. Threads 3 and 4 may execute on the third processor or, possibly thread 8 may execute on the third processor if thread 6 is still executing on the second processor and thread 7 is executing on the first processor after the completion of thread 1.

As is evident, many different threads may need to be executed; allocating which gets highest priority enables important components to be executed at a higher quality. Allocating threads may also reduce overall processor load by reducing a number of threads and costly switching between threads, such as when each component opens its own thread.

In terms of a user's perspective, the user will generally see his or her music video at a higher quality than the news clip. The user probably prefers this, as he or she paid for it, chose to put it in the foreground, and because it is of a kind of media where quality is more important (being in high definition).

Allocating Threads Based on Time/Resources Needed

As set forth above, the tools may allocate threads and priorities to decrease processor usage and improve quality of particular media components. The tools may also allocate threads to complete a component of a multimedia pipeline more quickly and/or with fewer resources.

Assume, for example, that the tools receive a multimedia topology having one or more composition components, such as topology 900 of FIG. 900. Composition components receive input from two or more other components capable of being processed in parallel.

In topology 900, for instance, video inputs 124c, 124d, and 124e pass data to video decoders 126c, 126d, and 126e, respectively. Two of these video decoders pass their data to composition 902, which then passes it to function 904. The third decoder 126e passes its data to composition 906, which also receives input from function 904.

Figure 10:
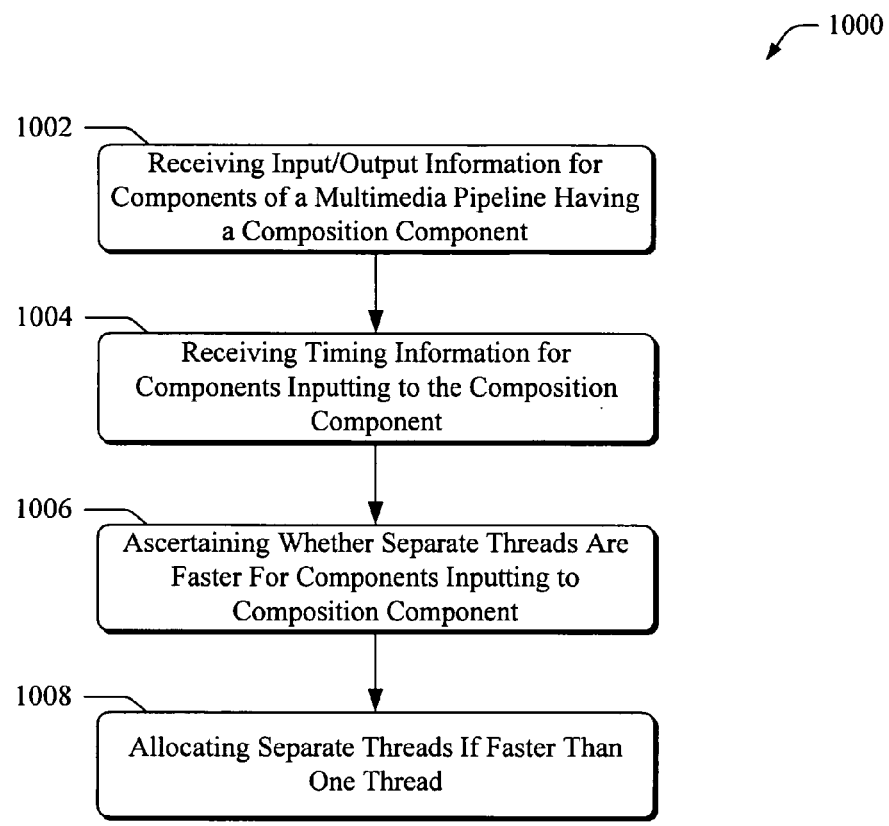
FIG. 10 is an exemplary process for allocating threads for a multimedia pipeline having a composition component.

Following the flow diagrams and/or processes set forth above, the tools can ascertain or receive input/output information or this topology according to step 1002 of process 1000 of FIG. 10. Process 1000 is shown illustrated as a series of steps representing individual operations or acts, some of which are described performed by elements of the operating environment 100 of FIG. 1 and some of which are not. Process 1000 is described using environment 100 to aid the reader in understanding ways in which the process may be implemented but is not intended to limit the scope of the process to this environment.

Step 1004 receives timing information, such as information indicating likely processing usage for components of a multimedia pipeline. The tools can receive information from a media application like 108 of FIG. 1, indicating that the likely processing time or usage of the video inputs and decoders, for instance.

Step 1006 ascertains which is faster or requires fewer resources: performing each of the parallel components and their input components in parallel with separate threads or in series with a single thread. Step 1006 can ascertain the parallel components inputting to the composition component and those components inputting the parallel components as set forth in step 1002, flow diagram 300, or process 600. Step 1006 may ascertain which option is faster based on the timing information and a time to switch between threads.

Controller 130 can ascertain, for instance, that a thread having video input 124c, video decoder 126c, video input 124d, and video decoder 124d takes less time or processing usage that two separate threads having just video input 124c/video decoder 126c and just video input 124d/video decoder 126d. This is possible because of the amount of processing needed by a computing device to is switch between threads. Here the time to switch can be more than is used by either video input 124c/video decoder 126c or video input 124d/video decoder 126d.

Step 1008 allocates separate threads for the parallel components and their input components if performing separate threads is faster or requires fewer processing resources than performing one thread.

Figure 9:
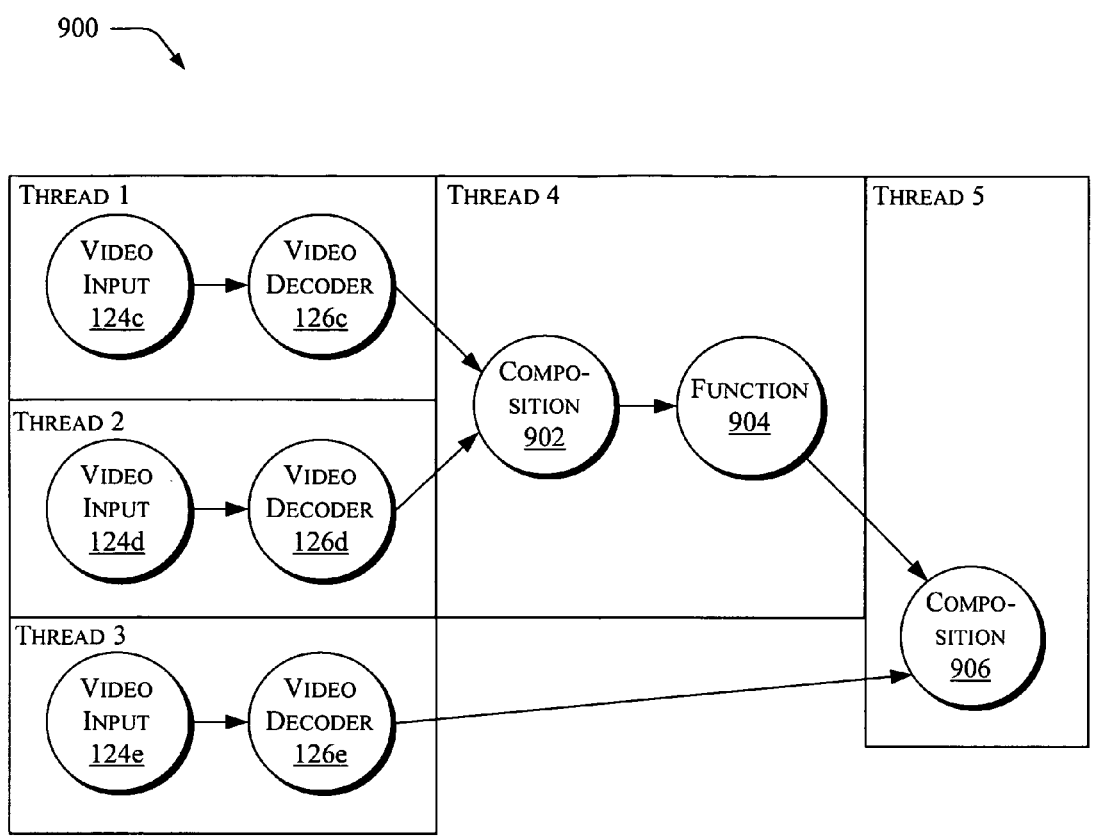
FIG. 9 illustrates an exemplary media pipeline topology having composition components.

Assume, for example, that five threads may be allocated for topology 900 of FIG. 9 (labeled threads 1-5). Controller 130 can receive information indicating that each of threads 1, 2, and 3 will take about the same about of time and that thread 4 will take longer than threads 1, 2, or 3. The controller can then allocate thread 1 and 2 to perform first on two processors (or cores of a multi-core processor) and, once 1 and 2 are complete, allocate that thread 3 run on one of the processors while thread 4 is allocated to run on the other. In this manner, thread 5 may complete quickly and without needing to spend processor. time switching between too many threads.

If, on the other hand, the controller receives information indicating that thread 3 will take a small amount of time or processing resources, it may be more efficient to finish thread 5 by allocating a single thread (not shown) to the current s threads 1 and 3 or 2 and 3. This is because the time and resources to switch threads is less than that for executing thread 3.

In this and similar ways the tools may allocate threads and assign priorities. The tools may operate through a central controller capable of determining these factors, which can reduce programming time needed to develop media applications and components. The tools may also save processing time and improve quality of multimedia pipelines and other pipeline-oriented processes.

CONCLUSION

The above-described systems and methods enable multi-thread multimedia processing. This multi-threaded multimedia processing can enable efficient, fast, and high quality media rendering. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A method comprising:
   receiving, via an application executable by one or more processors, topology information indicating input/output characteristics of components of a multimedia pipeline comprising two or more end components, including whether a particular component passes data to a single other component or more than one other component; and
   ascertaining which end components have an overlapping input with that of another of the end components to provide one or more sets of overlapping-input end components and one or more non-overlapping-input end components;
   allocating, by the one or more processors, multiple threads for the components of the multimedia pipeline based on the topology information, the allocating comprising:
      allocating a thread to each set of the overlapping-input end components and all components providing a direct or indirect input to any of the overlapping-input end components of that set; and
      allocating a thread to each of the non-overlapping-input end components and all components providing a direct or indirect input to each of the non-overlapping input end components.

2. A method as recited in claim 1, wherein the topology information comprises a topology mapping input/output characteristics of the components.

3. A method as recited in claim 1, wherein the topology information comprises input/output characteristics of each of the components, further comprising ascertaining a topology based on the topology information, and wherein the act of allocating is based on the topology.

4. A method as recited in claim 3, wherein the topology information is received from each of the components of the multimedia pipeline.

5. A method as recited in claim 1, further comprising receiving priority information indicating a priority for one of the components to provide a high-priority component and one or more low-priority components and wherein the act of allocating comprises:
   ascertaining which components provide inputs to the high-priority component; and
   assigning a high priority to each thread having one or more of the components that provide inputs to the high-priority component.

6. A method as recited in claim 1, further comprising receiving priority information indicating a priority for one of the components to provide a high-priority component and one or more low-priority components and wherein the act of allocating comprises:
   ascertaining whether one or more components conflict with the high-priority component or any components providing input to the high-priority component; and
   allocating a low-priority thread to the one or more conflicting components.

7. A method as recited in claim 1, further comprising receiving usage information for the multimedia pipeline, the usage information indicating how media of the multimedia pipeline is to be used or viewed.

8. A method as recited in claim 7, wherein the act of allocating comprises assigning priority to one of more of the multiple threads based on the usage information.

9. A method as recited in claim 1, further comprising receiving value information for the multimedia pipeline, the value information indicating a value of media of the multimedia pipeline.

10. A method as recited in claim 9, wherein the act of allocating comprises assigning priority to one or more of the multiple threads based on the value information.

11. A method as recited in claim 1, further comprising instructing at least one of the components of the multimedia pipeline to refrain from opening threads.

12. A method as recited in claim 1, further comprising requesting the topology information.

13. A method as recited in claim 12, wherein the act of requesting comprises requesting the topology information from a media application comprising at least one of the components of the multimedia pipeline.

14. A method as recited in claim 1, further comprising executing the components according to the threads and the priority of the threads.

15. A method as recited in claim 14, wherein at least one thread is executed on a first processor and at least one thread is executed on a second processor.

16. A method as recited in claim 1, wherein the multimedia pipeline having a composition component having inputs from two or more parallel components, the parallel components capable of being processed in parallel, and the method further comprising:
   receiving timing information for the parallel components and their input components, the input components for each parallel component providing direct or indirect input to each parallel component;
   ascertaining whether performing each of the parallel components and their input components in separate threads or in one thread is faster for a multi-core or multi-processor computing device based on the timing information and a time needed for the computing device to switch between threads; and
   allocating separate threads to the parallel components and their input components if performing the separate threads in parallel is faster than performing the one thread.

17. A method as recited in claim 16, wherein the timing information comprises likely processing resource usage for the parallel components and their input components.

18. One or more computer-readable memory having computer-readable instructions encoded therein that, when executed by one or more processors, configure a computer to perform operations comprising:
   receiving topology information indicating input/output characteristics of components of a multimedia pipeline comprising two or more end components, including whether a particular component passes data to a single other component or more than one other component; and ascertaining which end components have an overlapping input with that of another of the end components to provide one or more sets of overlapping-input end components and one or more non-overlapping-input end components, allocating, by the one or more processors, multiple threads for the components of the multimedia pipeline based on the topology information, the allocating comprising:

allocating a thread to each set of the overlapping-input end components and all components providing a direct or indirect input to any of the overlapping-input end components of that set; and allocating a thread to each of the non-overlapping-input end components and all components providing a direct or indirect input to each of the non-overlapping input end components.

19. A system comprising:

a processor;

a memory coupled to the processor, the memory having computer-executable instructions encoded thereon that when executed configure the processor to perform operations comprising:

receiving topology information indicating input/output characteristics of components of a multimedia pipeline comprising two or more end components, including whether a particular component passes data to a single other component or more than one other component; and ascertaining which end components have an overlapping input with that of another of the end components to provide one or more sets of overlapping-input end components and one or more non-overlapping-input end components, allocating, by the one or more processors, multiple threads for the components of the multimedia pipeline based on the topology information, the allocating comprising:

allocating a thread to each set of the overlapping-input end components and all components providing a direct or indirect input to any of the overlapping-input end components of that set; and allocating a thread to each of the non-overlapping-input end components and all components providing a direct or indirect input to each of the non-overlapping input end components.

\* \* \* \* \*